(No Model.)
D. R. MURPHY.
FEEDER FOR LOCOMOTIVE INJECTORS AND PUMPS.
No. 263,661. Patented Aug. 29, 1882.
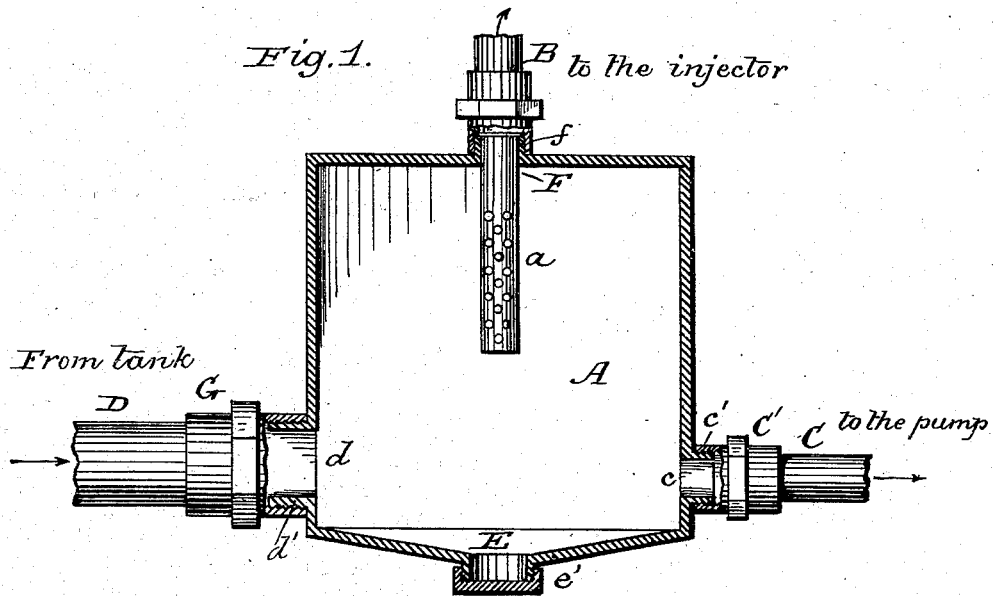
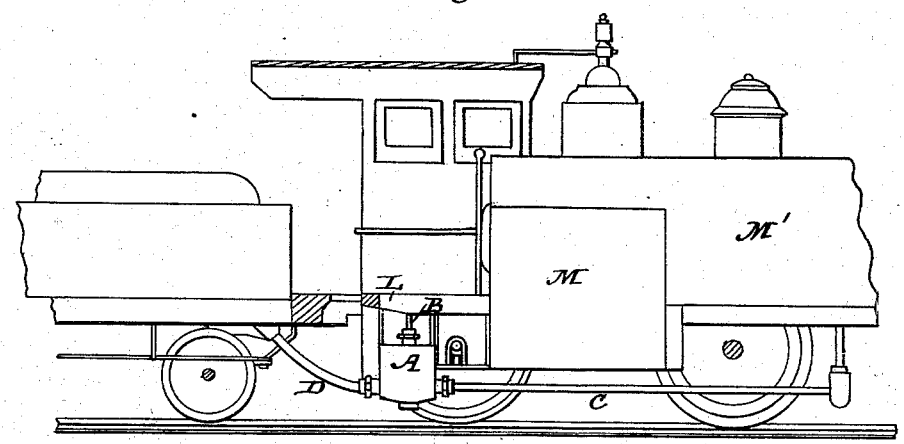
Witnesses:
L. C. Hille
C. C. Shepherd
Inventor:
Daniel R. Murphy
by E. E. Masson
atty.

UNITED STATES PATENT OFFICE.

DANIEL R. MURPHY, OF NEWARK, ASSIGNOR OF ONE-HALF TO GURDON D. JOHNSON, OF GRANVILLE, OHIO.

FEEDER FOR LOCOMOTIVE INJECTORS AND PUMPS.

SPECIFICATION forming part of Letters Patent No. 263,661, dated August 29, 1882.

Application filed July 8, 1882. (No model.)

*To all whom it may concern:*

Be it known that I, DANIEL R. MURPHY, a citizen of the United States, residing at Newark, in the county of Licking and State of Ohio, have invented a new and useful Water-Feeder for Locomotive Injectors and Pumps, of which the following is a specification.

The objects of my invention are, first, to construct a device by means of which all the water in the tank of a locomotive can be used; second, to provide means whereby the injector and pump of a locomotive can be operated at the same time; third, to provide the injector with clear water. I attain these objects by combining with a locomotive a water receptacle or feeder secured to the bottom frame of the locomotive, being connected by means of pipes with the tank, pump, and injector, provided with a strainer, and having an outlet for accumulated dirt in its bottom, as more fully described hereinafter.

In the accompanying drawings, Figure 1 is a transverse section of the feeder, and Fig. 2 is a sectional view of a portion of the locomotive and tender to which my invention is attached.

Similar letters refer to similar parts throughout the several views.

A represents the interior of the feeder, having its four sides and top of equal size. This feeding-tank is secured to the frame L of a locomotive in front or rear of the fire-box M of the boiler M'. At a point, $d$, on one side and near the bottom of the feeder is an opening and a hollow cylindrical projection, $d'$, having on its outer periphery a screw-thread cut to engage with a thread cut upon the inner surface of a connecting-nut, G, said connecting-nut G joining in a like manner at its other end with the pipe D, which extends outward and upward to and connects with the bottom of the tank. On the opposite side of the feeder, and at a point directly opposite the opening $d$, is a similar though smaller opening, $c$, and projection $c'$, to which is attached the pipe C, in the manner described, for the pipe D, said pipe C leading to the pump. In the center of the top of the feeder is an opening, F, and hollow cylindrical projection, $f$, to which latter is attached the pipe B, leading directly to the injector, in the manner described, for the pipe D. In the opening F is secured a metal tube, $a$, having a projecting top rim, which rests upon the top of the projection $f$. Said tube $a$ extends down into the center of the feeder, and is provided with a number of small perforations at regular intervals on its outer circumference and closed lower end to prevent the passage of the dirt which may be in the water into the pipe leading to the injector. The bottom of the feeder is made slightly conical, so that the sand and heavier dirt which may be in the water will wash down the incline and settle at the center and lowest point in the bottom, at which point the feeder is provided with an opening, E, and a slight hollow cylindrical projection, $e$, having on its outer surface a screw-thread, which engages with the thread upon the inner surface of the tap $e'$, which can be disengaged to allow the escape of the accumulated dirt when necessary. The top line of perforations on the tube or strainer $a$ is four inches below the top of the feeder, allowing space for the accumulated floating dirt to remain without clogging the perforations, and thus stopping the flow of water to the injector.

The water in the tank of the locomotive is carried to the feeder by means of the pipe D, the capacity of which is equal to that of the pipes C and B combined. The top of the feeder being considerably below the bottom of the tank, while there remains in the tank any water whatever the feeder will remain filled. Heretofore when the water in the tank has been reduced to a small quantity the motion of the engine has caused the water to wash away from the opening connecting with the injector, and the latter has refused to work. By my device the injector has a steady body of water from which to draw, and will work while there remains any water whatever in the tank.

By my device the pump and injector of a locomotive can be operated at the same time, whereas by the present method the suction produced by the operation of the pump overcomes the force of the injector, having a much smaller body of water to operate from.

Heretofore all dirt or sediment contained in the water has been allowed to pass into the injector or pump, and, as has been often demonstrated, interferes with the operation of the same.

Having now fully described my invention, what I claim, and desire to secure by Letters Patent, is—

1. The combination of the frame and boiler of a locomotive and its tender with a water-tank, A, connected with said frame and having an opening, d, on one side connected with the tender, an opening, c, connected with a pump, and a top pipe, B, connected with an injector, substantially as and for the purpose described.

2. The combination of a locomotive and its tender with a water-tank, A, having openings c and d, connecting with the tank and pump in the sides, opening E in the bottom, and pipe B in the top, connected to the injector, with a pendent strainer, a, connected with the top pipe, B, substantially as and for the purpose described.

DANIEL R. MURPHY.

Witnesses:
CHARLES H. KIBLER,
EDWARD KIBLER.